US006076552A

United States Patent [19]

Takahashi et al.

[11] Patent Number: 6,076,552

[45] Date of Patent: *Jun. 20, 2000

[54] VALVE STRUCTURE FOR HYDRAULIC CIRCUIT

[75] Inventors: Teruyasu Takahashi; Hidenori Sakai, both of Kanagawa, Japan

[73] Assignees: Nissan Motor Co., Ltd.; Tosok Corporation, both of Kanagawa, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/832,354

[22] Filed: Apr. 2, 1997

[30] Foreign Application Priority Data

Apr. 2, 1996 [JP] Japan .................................... 8-079991

[51] Int. Cl.[7] ........................................ F16K 3/26

[52] U.S. Cl. ................................ 137/625.3; 137/625.37; 137/625.69

[58] Field of Search ........................... 137/625.3, 625.37, 137/625.69

[56] References Cited

U.S. PATENT DOCUMENTS

| | | | |
|---|---|---|---|
| 1,285,769 | 11/1918 | Melcher | 137/625.3 |
| 2,764,181 | 9/1956 | Richolt | 137/625.4 X |
| 3,138,175 | 6/1964 | Chilcoat | 137/625.3 |
| 3,199,538 | 8/1965 | Anthon | 137/625.67 X |
| 3,791,413 | 2/1974 | Muller et al. | 137/625.3 |
| 4,535,821 | 8/1985 | Anderson | 137/625.48 X |
| 4,572,238 | 2/1986 | Stenlund | 137/625.3 |

FOREIGN PATENT DOCUMENTS

| | | | |
|---|---|---|---|
| 79983 | 1/1951 | Czechoslovakia | 137/625.3 |

*Primary Examiner*—Gerald A. Michalsky
*Attorney, Agent, or Firm*—McDermott, Will & Emery

[57] ABSTRACT

A valve comprises a spool with a land received in a bore of a valve body. The land is formed with at least one transfer passage. The land and cylindrical inner wall of the bore cooperate with each other to prevent any passage other than the transfer passage from opening between an inlet port and an outlet port. The transfer passage is always open to the outlet port and selectively uncovered by the cylindrical inner wall to communicate with the inlet port in response to movement of the spool.

13 Claims, 9 Drawing Sheets

VALVE STRUCTURE FOR HYDRAULIC CIRCUIT

BACKGROUND OF THE INVENTION

1. Field of the Invention

The present invention relates to a valve structure for a hydraulic circuit.

2. Description of the Related Art

In hydraulic circuits, spools are used in regulating flow of hydraulic fluid from an inlet port to an outlet port. A spool is received in a bore having a cylindrical inner wall. The spool has spaced lands. With the lands opposed to the cylindrical inner wall, the spool can move in a longitudinal direction of the bore. The cylindrical inner wall is divided into a plurality of wall segments by a plurality grooves. The grooves are recessed from the cylindrical inner wall. The adjacent two of the grooves, namely an inflow groove and an outflow groove, are separated by a first one of the plurality of wall segments. Inlet and outlet ports are open at the bottoms of the inflow and outflow grooves, respectively. Among the lands, there are two lands, namely an upstream land and a downstream land. The upstream land cooperates with the one wall segment that is disposed between the inflow and outflow grooves. The downstream land cooperates with another wall segment that is spaced from the one wall segment by the outflow groove. Over the stroke of the spool, the downstream land keeps in engagement with the another wall segment and leaves the outflow groove uncovered. Under this condition, a chamber defined in the bore between the two lands is kept in flow communication with the outlet port. At one limit position of the stroke of the piston, the upstream land engages with one wall segment thereby closing flow communication between the inflow groove and the chamber. As the spool moves from this one limit position toward the opposite limit position of the stroke, there is a predetermined position where the upstream land is about to disengage from the one wall segment. When the spool moves further beyond the predetermined position, an inner axial edge of the upstream land leaves the one wall segment thereby defining a gap between them. This gap increases in width as the spool moves further beyond the predetermined position. Hydraulic fluid from the inflow groove flows through this gap toward the outflow groove.

An object of the present invention is to provide an alternative to the valve of the kind mentioned above.

SUMMARY OF THE INVENTION

According to one aspect of the present invention there is provided a hydraulic control circuit for an automatic transmission, comprising:

an oil pump as a source of hydraulic fluid;

a system pressure line connected to said oil pump; and a pressure regulator valve, including:

said pressure regulator valve including:

a valve body formed with a bore having a longitudinal center line, said valve body being formed with an inlet port connected to said system pressure line and an outlet port, said valve body including a cylindrical inner wall defining said bore and formed with an inflow groove communicating with said inlet port and an outflow groove communicating with said outlet port, said inflow and outflow grooves being recessed from said bore into the cylindrical inner wall and spaced from each other along said longitudinal center line to define therebetween a cylindrical inner wall segment, said cylindrical inner wall segment having an edge adjacent said inflow groove; and a spool within said bore for movement along said longitudinal center line, said spool including a land opposed to said cylindrical inner wall segment, said land being in sliding fit to said cylindrical inner wall segment during movement of said spool to close a clearance between said land and said cylindrical inner wall segment, said land being formed with a plurality of transfer passages, each in the form of a groove that extends along said longitudinal center line, said plurality of transfer passages being separated from each other, each of said plurality of transfer passages having one end and other end and extending from said one end to said other end, each of said plurality of transfer passages having a predetermined section extending from said one end to a point between said one end and said other end, said predetermined section of each transfer passage being opposed to said cylindrical inner wall segment and prevented from communicating with said inflow groove when said spool assumes a predetermined position relative to said valve body, said predetermined section of each transfer passage being brought into opposed relation to said inflow groove gradually as said spool moves from said predetermined position within a predetermined stroke of movement of said spool relative to said valve body, said edge of said cylindrical inner wall segment and said predetermined section defining various flow cross sectional areas as said spool moves from said predetermined position within said predetermined stroke of movement of said spool relative to said body.

According to another aspect of the present invention, there is provided a valve comprising:

a valve body formed with a bore having a longitudinal center line, said valve body including a cylindrical inner wall and two end walls spaced along said longitudinal center line and interconnected by said cylindrical inner wall to define said bore, said valve body being formed with an inflow groove that is recessed from said bore into said cylindrical inner wall, said valve body being formed with an outflow groove that is recessed from said bore into said cylindrical inner wall, said inflow and outflow grooves dividing said cylindrical inner wall into a plurality of wall segments including a predetermined wall segment that separate said inflow groove from said outflow groove, said predetermined wall segment including an edge adjacent said inflow groove; and a spool within said bore for movement along said longitudinal center line, said spool including a land, said land being opposed to said predetermined wall segment and in sliding fit to said predetermined wall segment during movement of said spool to close a clearance between said land and said predetermined wall segment, said land being formed with a plurality of transfer passages, each in the form of a groove that extends along said longitudinal center line, said land being opposed to said predetermined wall segment and in sliding fit to said predetermined wall segment to close a clearance between said land and said predetermined wall segment during movement of said spool relative to said valve body over substantially all stroke allowed for said spool to move along said longitudinal center line, each of said plurality of transfer passages being open to said outflow groove over substantially all strike allowed for said spool to move along said longitudinal center line, said plurality of transfer passage being separated from each other, each of said plurality of transfer passage having one end and other end and extending along said center line from said one end to said other end, each of said plurality of transfer passages having a predetermined section extending from said one end to a point between said one end and said other end, said predetermined section of each transfer passage being opposed to said predetermined wall segment and prevented from communicating with said inflow groove when said spool assumes a predetermined position relative to said valve body, said predetermined section of each transfer passage being brought into opposed relation to said inflow groove gradually as said spool moves from said predetermined position within the stroke allowed for said spool to move along said center line relative to said valve body, said edge of said predetermined wall segment and said predetermined section defining various flow cross sectional areas as said spool moves from said predetermined position within the stroke allowed for said spool to move along said center line relative to said valve body.

DETAILED DESCRIPTION OF THE INVENTION

Figure 1:
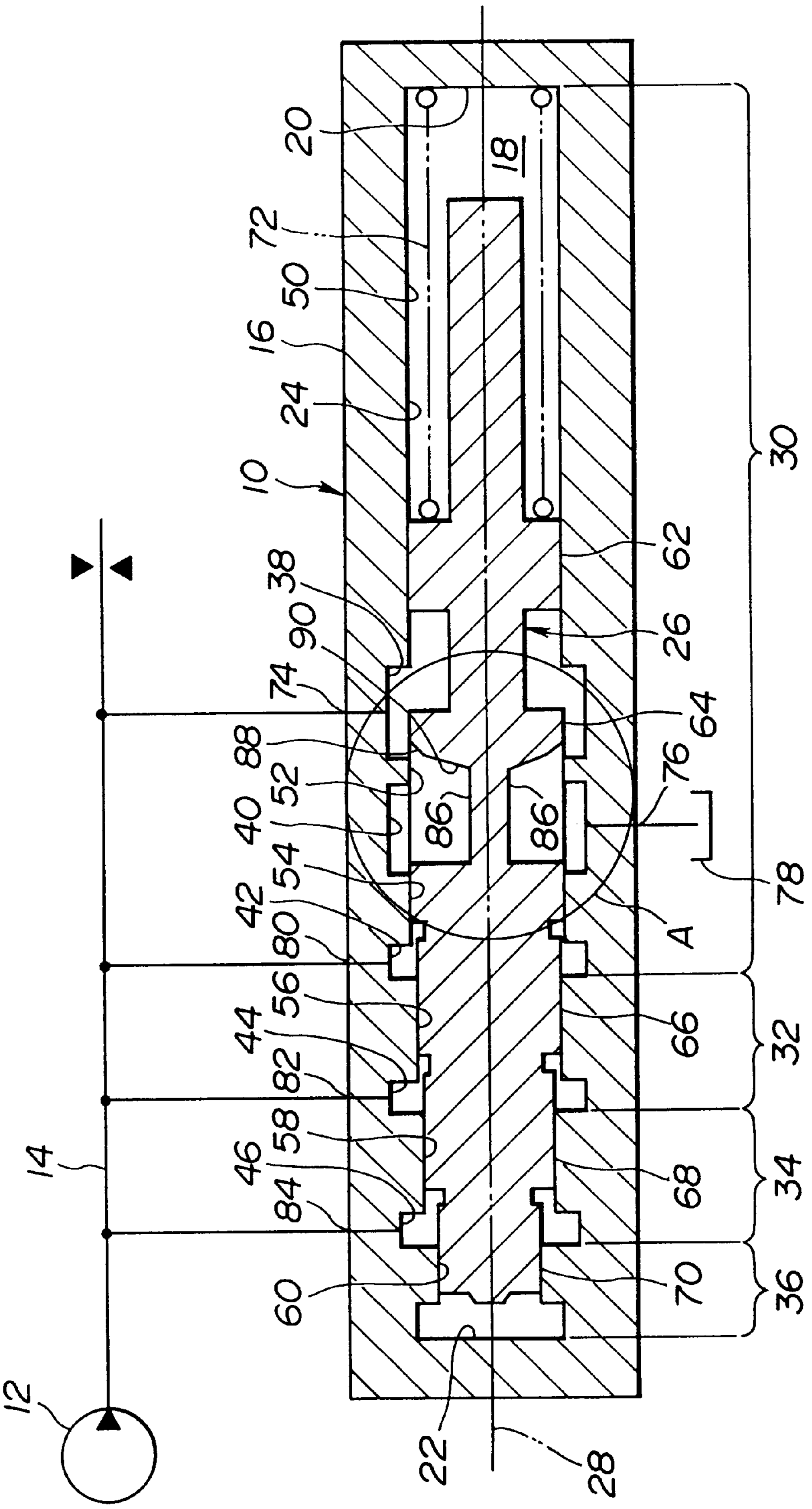
FIG. 1 is a schematic sectional view of a first embodiment of a valve according to the present invention.

Referring to FIG. 1, there is shown a portion of a hydraulic control circuit for an automatic transmission. In FIG. 1, a pressure regulator valve 10 is schematically illustrated in association with an oil pump 12 and a system pressure line 14. The pressure regulator valve 10 includes a valve body 16. The valve body 16 is formed with a valve bore 18 and has two end walls 20 and 22 that are spaced and interconnected by a cylindrical inner wall 24 to define the bore 18. The bore 18 has received therein a spool 26. The spool 26 can move along a longitudinal center line 28 along which the end walls 20 and 22 are spaced. The bore 18 has four sections 30, 32, 34 and 36 with different diameters, respectively. Among all, the bore section 30 is the largest in diameter and the bore section 36 is the smallest in diameter. The bore section 32 is reduced and has a diameter smaller than that of the bore section 30. The bore section 34 has a diameter smaller than that of the bore section 32. The valve body 16 is formed with an inflow groove 38 and an outflow groove 40. The grooves 38 and 40 are recessed from the bore section 30 into the cylindrical inner wall 24 and spaced from each other along the longitudinal line 28. The valve body 16 is also formed with three signal pressure grooves 42, 44 and 46. The signal pressure groove 42 is recessed from the bore section 30 into the cylindrical inner wall 24 and arranged at the border of the bore section 30 with the adjacent bore section 32 to provide an interface between them. The signal pressure groove 44 is recessed from the bore section 32 into the cylindrical inner wall 24 and arranged at the border of the bore section 32 with the adjacent bore section 34 to provide an interface between them. The signal pressure groove 46 is recessed from the bore section 34 into the cylindrical inner wall 24 and arranged at the border of the bore section 34 with the adjacent bore section 36 to provide an interface between them. The inflow groove 38, outflow groove 40 and signal pressure grooves 42, 44 and 46 are spaced one after another along the longitudinal line 28 and separate the cylindrical inner wall 24 into six wall segments 50, 52, 54, 56, 58 and 60 between the end walls 20 and 22. Specifically, the wall segment 50 is defined between the end wall 20 and the inflow groove 38. The wall segment 52 is defined between the inflow groove 38 and the outflow groove 40. The wall segment 54 is defined between the outflow groove 40 and the signal pressure port 42. The wall segment 56 is defined between the signal pressure ports 42 and 44. The wall segment 58 is defined between the signal pressure ports 44 and 46. The wall segment 60 is defined between the signal pressure port 46 and the end wall 22.

The spool 26 has a first land 62 opposed to the wall segment 50, a second land 64 opposed to both of the wall segments 52 and 54, a third land 66 opposed to the wall segment 56, a fourth land 68 opposed to the wall segment 58, and a fifth land 70 opposed to the wall segment 60. A spring 72 is mounted within the bore section 30. At one end thereof, the spring 72 bears against the end wall 20 and at the opposite end thereof, it bears against the first land 62.

The inflow groove 38 communicates with an inlet port 74 that is connected to the system pressure line 14. The outflow groove 40 communicates with an outlet port 76 that is connected to drainage 78. The signal pressure groove 42 communicates with a first signal pressure port 80 that is connected to the system pressure line 14. The signal pressure groove 44 communicates with a second signal pressure port 82 that is connected to the system pressure line 14. The signal pressure groove 46 communicates with a third signal pressure port 84 that is connected to the system pressure line 14. The first and second lands 62 and 64 have the same diameter. The third land 66 has a diameter less than the diameter of the second land 64 thereby defining a first pressure acting area exposed to pressure within the signal pressure groove 42. The fourth land 68 has a diameter smaller less than the diameter of the third land 66 thereby defining a second pressure acting area exposed to pressure within the signal pressure groove 44. The fifth land 70 has a diameter less than the diameter of the fourth land 68 thereby defining a third pressure acting area exposed to pressure within the signal pressure groove 46.

Figure 2:
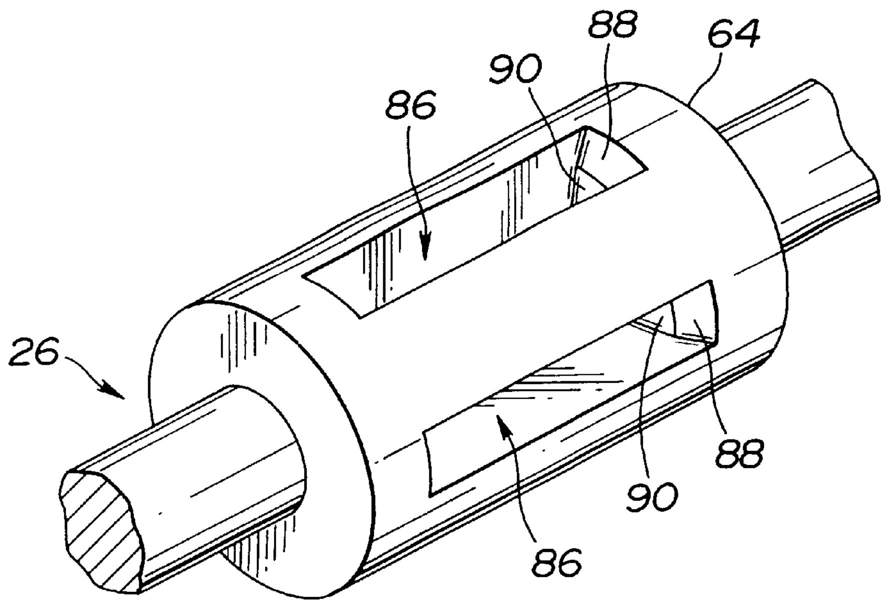
FIG. 2 is a fragmentary perspective view of a spool of the valve shown in FIG. 1.

As shown in FIG. 2, the second land 64 is formed with at least one transfer passage. In this embodiment, the land 64 is formed with four such transfer passages, each of them being designated by the same reference numeral 86. Each of the transfer passages 86 is in the form of an axial groove that extends along the longitudinal line 28 of the bore 18. The transfer passages 86 are parallel to each other and spaced one after another in an angular direction about the longitudinal line 28 of the bore 18. The arrangement is such that the transfer passages 86 are always open to the outflow groove 40 over the whole stroke of the spool 26 within the bore 18. The width of each of the transfer passages 86 is unaltered over the whole length from one end adjacent the inflow groove 38 to the opposite end remotest from the inflow groove 38. As best seen in FIG. 1, the depth of each of the transfer passages 86 increases at a first gradual rate from the level of the surface of the second land 64 for a unit increase in the distance from the one end until a first predetermined distance is reached. After the first predetermined distance has been reached, the depth increases at a second gradual rate that is greater than the first gradual rate for a unit increase in the distance until a second predetermined distance that is greater than the first predetermined distance is reached. After the second predetermined distance has been reached, the depth is unaltered until a third predetermined distance is reached. This third predetermined distance is greater than the second predetermined distance and it is the distance over which the opposite end of each of the transfer passages 86 is spaced from the one end thereof. In FIGS. 1, 2 and 4A to 4C, the reference numeral 88 designates a gradual slope until the first predetermined distance is reached, and the reference numeral 90 designates a steep slope after the first predetermined distance has been reached until the second predetermined distance is reached.

When the oil pump 12 is at rest, the spool 26 assumes a position set by the spring 72. Viewing in FIG. 1, the spring set position is displaced leftwards from the illustrated position and defined when the spool 26 abuts the end wall 22. Under this condition, the wall segment 52 engages the land 64 at a portion between the one end of each of the transfer passages 86 and the adjacent edge of the land 64 thereby blocking flow communication between the inflow groove 38 and the transfer passages 86. Thus, there is no fluid flow communication between the inflow and outflow grooves 38 and 40.

Figure 3:
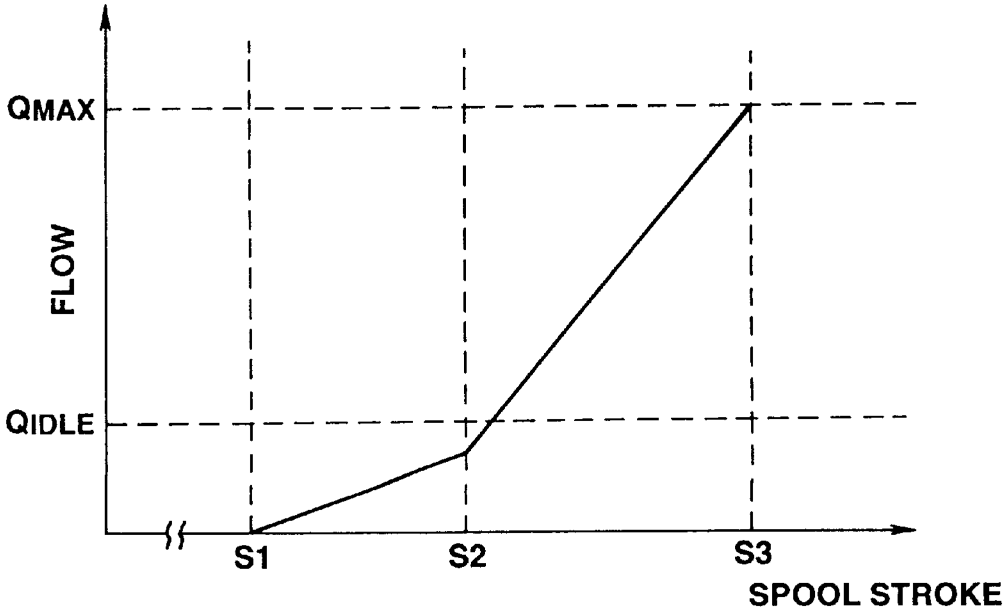
FIG. 3 is a flow vs. stroke characteristic of the valve shown in FIG. 1.

Let us now consider a stroke of the spool 26 from the spring set position to the right, viewing in FIG. 1 against the bias of the spring 72. Until the spool 26 moves by a first stroke S1, the wall segment 52, which engages the land 64, continues to block flow communication between the inflow groove and the transfer passages 86. Thus, there is no flow through the transfer passages 86 as shown in FIG. 3.

Figure 4A:
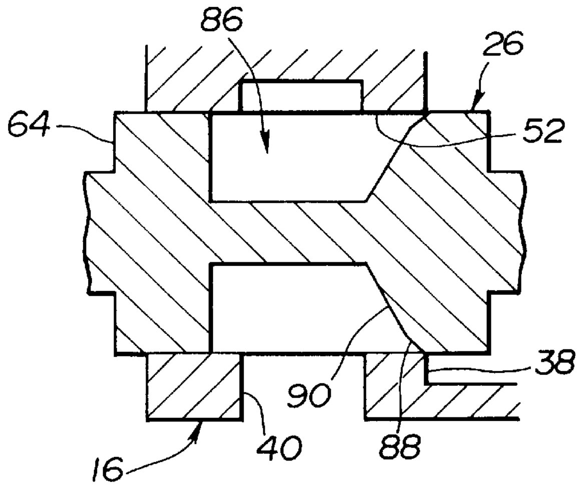
FIGS. 4A, 4B, and 4C are enlarged views of a portion enclosed by a circle A in FIG. 1, illustrating three different positions of the spool.

At the moment when the spool 26 has moved from the spring set position by the first stroke S1, the wall segment 52 is about to expose the slope 88 of each of the transfer passages 86 to the inflow groove 38 as shown in FIG. 4A.

Immediately after the spool 26 has moved from the spring set position beyond the first stroke S1 position, the wall segment 52 exposes the slope 88 to the inflow groove 38. As the spool 26 moves further beyond the position as illustrated in FIG. 4A, the wall segment 52 increases the exposure area of the slope 88 to the inflow groove 38. This relationship between the exposure area and the stroke continues until the spool 26 moves from the spring set position by the second stroke S2 that is greater than the first stroke S1.

Figure 4B:
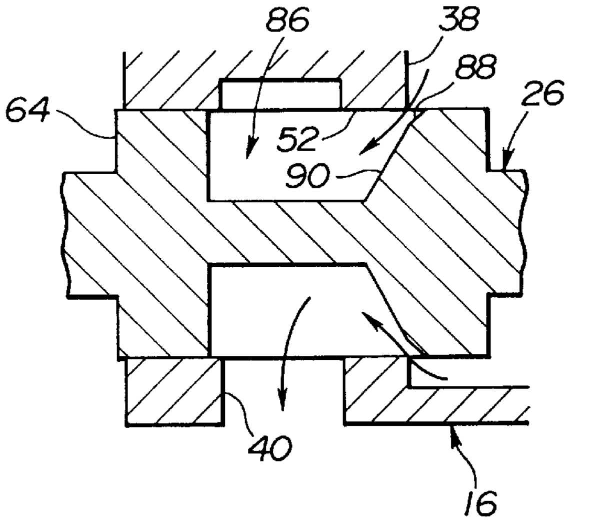

At the moment when the spool 26 has moved from the spring set position by the second stroke S2, the wall segment 52 is about to expose the slope 90 of each of the transfer passages 86 to the inflow groove 38 as shown in FIG. 4B.

Immediately after the spool 26 has moved from the spring set position beyond the second stroke S2 position, the wall segment 52 exposes the slope 90 to the inflow groove 38, too. As the spool 26 moves further beyond the position as illustrated in FIG. 4B, the wall segment 52 increases the exposure area of the slope 90 to the inflow groove 38. This relationship between the exposure area and the stroke continues until the spool 26 moves from the spring set position by the third stroke S3 that is greater than the second stroke S1.

Figure 4C:
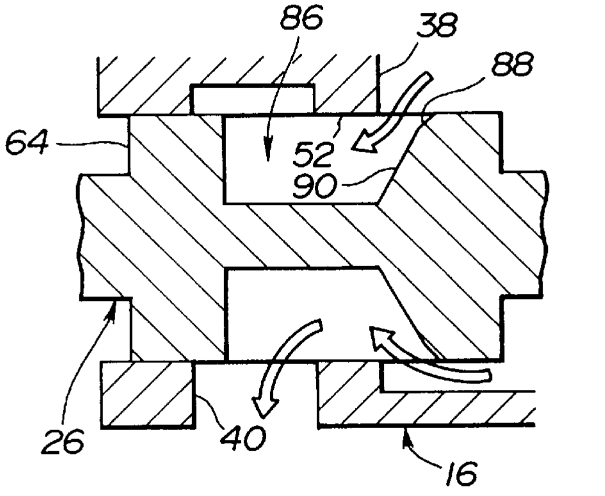

At the moment when the spool 26 has moved from the spring set position by the third stroke S3, the wall segment 52 is about to expose the deepest bottom wall of each of the transfer passages 86 to the inflow groove 38 as shown in FIG. 4C.

The effective flow area of the transfer passages 86 varies at a first rate that is determined by the gradient of the slope 88 during movement of the spool 26 between the first stroke S1 position (see FIG. 4A) and the second stroke S2 position (see FIG. 4B). During movement of the spool 26 between the second stroke S2 position and the third stroke position S3, the effective flow area of the transfer passages 86 varies at a second rate that is determined by the gradient of the slope 90. The second rate is greater than the first rate since the gradient of the slope 90 is steeper than that of the slope 88. The effective flow area of the transfer passages 86 becomes maximum when the spool 26 is at the third stroke S3 position.

The pump 12 used in this embodiment is driven by the engine. Thus, the rate of flow delivered the pump 12 is proportional to the engine speed at least over a predetermined range of engine speeds. FIG. 3 shows variations of flow rate of hydraulic fluid passing through the transfer passages 86 against the stroke of the spool 26 as the engine speed increases beyond the idling speed after cranking operation. In FIG. 3, the flow rate through the transfer passages 86 when the engine idles is shown at $Q_{IDLE}$. This flow rate $Q_{IDLE}$ is obtained after the spool 26 has moved beyond the second stroke S2 position toward the third stroke S3 position. The maximum flow rate $Q_{MAX}$ is obtained when the spool 26 has reached the third stroke S3 position. Normally, the pressure regulator valve 10 varies the flow rate between $Q_{IDLE}$ and $Q_{MAX}$ in controlling discharge of hydraulic fluid to maintain hydraulic pressure within the system pressure line 14 at a line pressure $P_L$.

As will be appreciated from FIG. 3, the gradient of the slope 90 determines the flow rate versus stroke characteristic that is used during normal operation of the flow regulator valve 10. This means that varying the gradient of the slope 90 of each of the transfer passages 86 can easily optimize the flow rate versus stroke characteristic.

It can be also appreciated that the transfer passages 86 determine the flow rate of hydraulic fluid passing from the inflow groove 38 to the outflow groove 40 since the land 64 maintains contact with the wall segment 64 and the wall segment 66, too.

Figure 5:
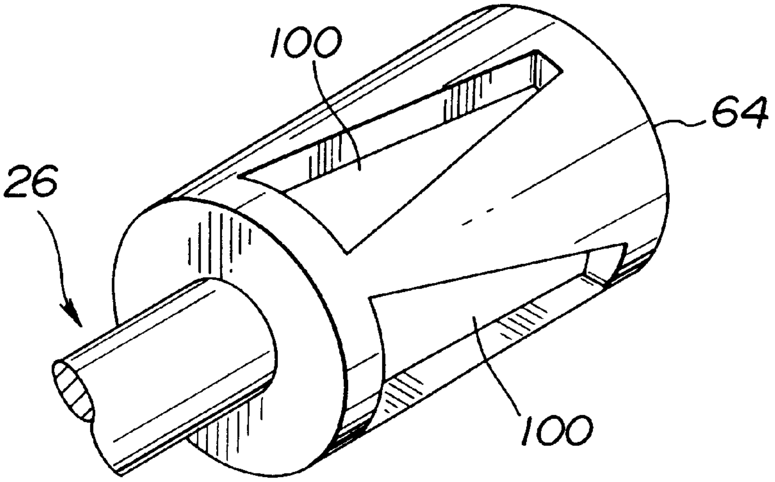
FIG. 5 is a similar view to FIG. 2 illustrating a first modification of the spool.
Figure 6:
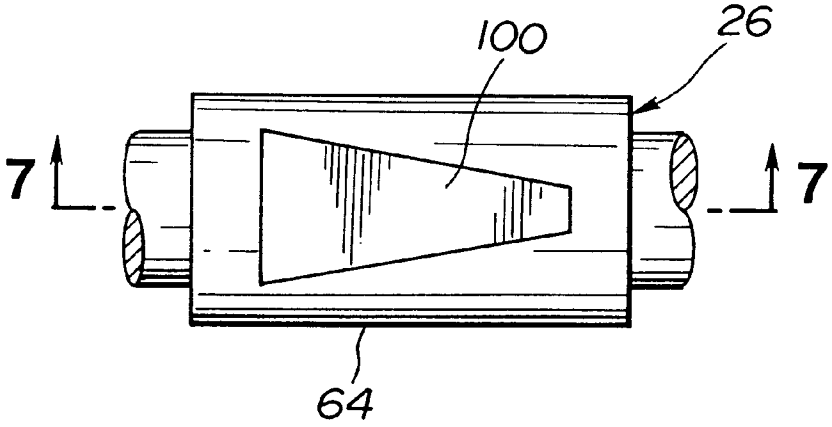
FIG. 6 is a plan view of the spool shown in FIG. 5.
Figure 7:
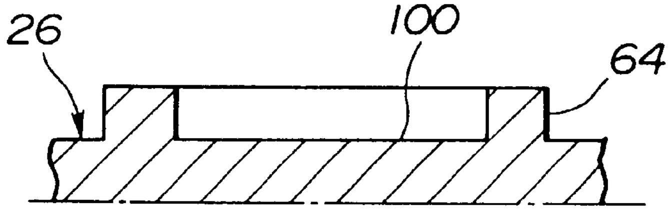
FIG. 7 is a fragmentary sectional view taken through the line 7—7 shown in FIG. 6.
Figure 8:
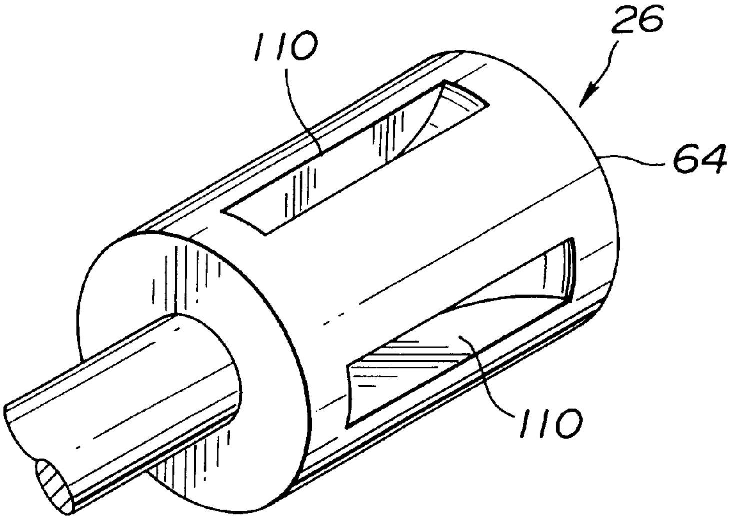
FIG. 8 is a similar view to FIG. 2 illustrating a second modification of the spool.
Figure 9:
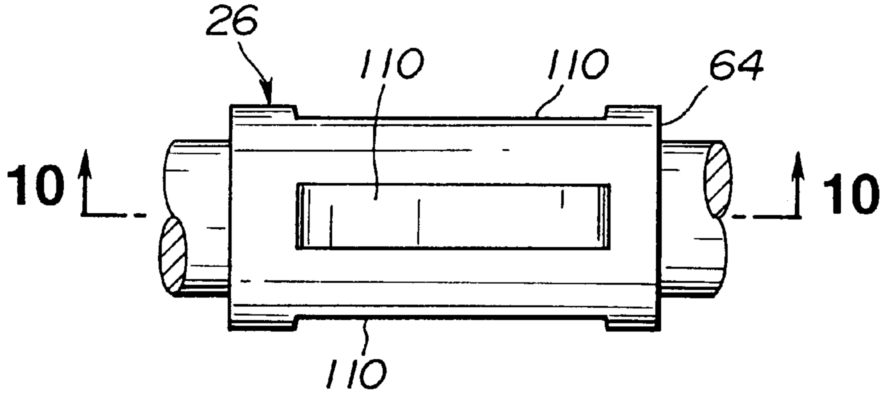
FIG. 9 is a plan view of the spool shown in FIG. 8.
Figure 10:
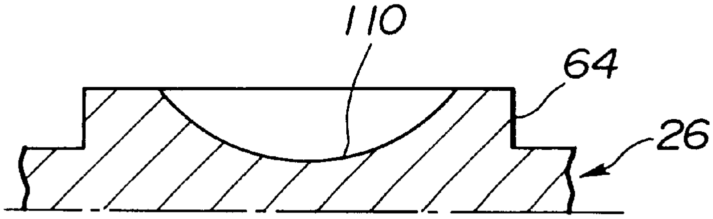
FIG. 10 is a fragmentary sectional view taken through the line 10—10 shown in FIG. 9.

In the previously described embodiment, with the width of each of the transfer passages 86 unaltered, the slopes 88 and 90 can vary the depth of each of the transfer passage to vary the effective flow area as the spool 26 moves. Another alternative to vary the effective flow area involves varying the width of each of transfer passages 100 as shown in FIGS. 5, 6 and 7 with the depth thereof unaltered. Other alternative involves cylindrically recessing the bottom of each of transfer passages 110 with the width thereof unaltered as shown in FIGS. 8, 9 and 10. This modification is easy to form by milling operation.

The transfer passages 86 and 100 require skilled work to form. This attributes mainly to the fact that there is no pass for a cutting tool. One approach to solve this problem is to split the single land 64 (see FIG. 2) into two land sections 64A and 64B as shown in FIGS. 11, 12 and 13.

Figure 11:
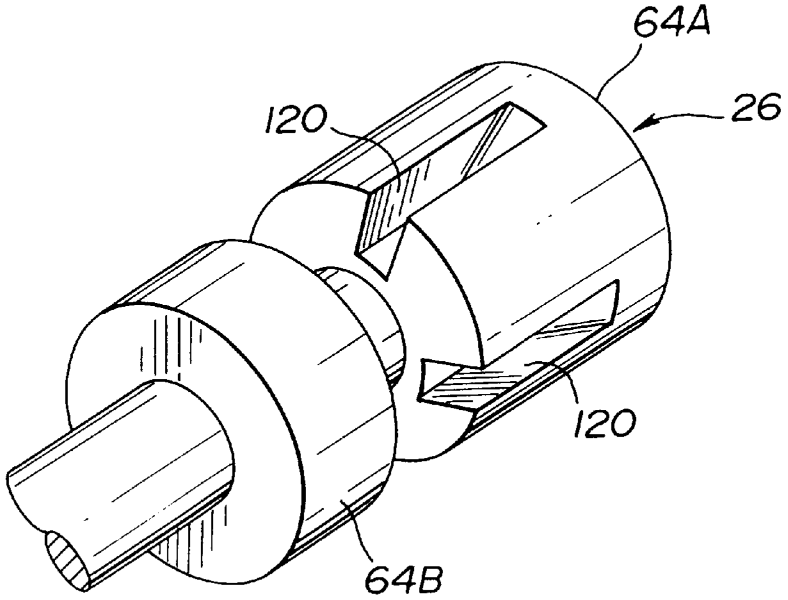
FIG. 11 is a similar view to FIG. 2 illustrating a third modification of the spool.
Figure 12:
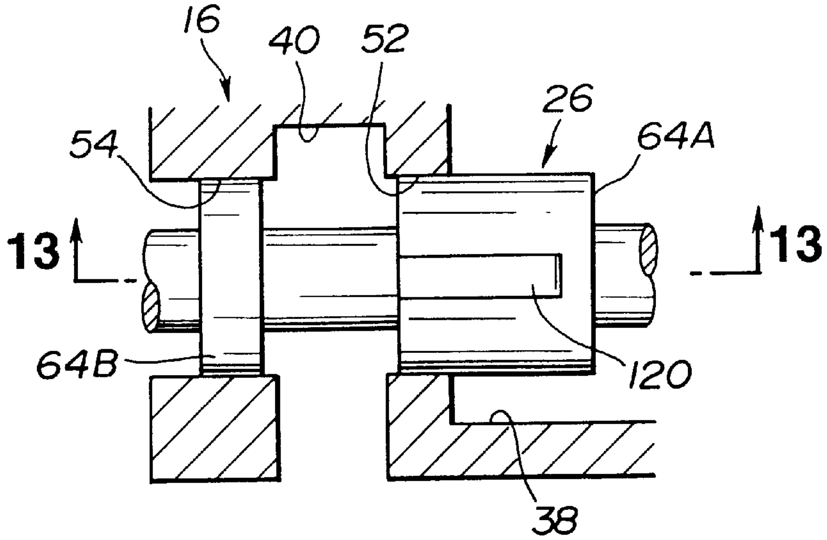
FIG. 12 is a fragmentary sectional view of a valve illustrating a plan view of the spool shown in FIG. 11.
Figure 13:
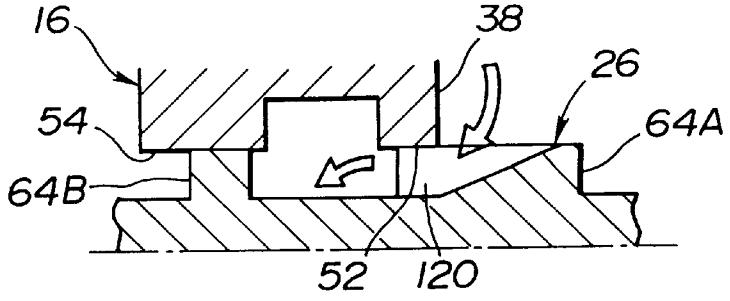
FIG. 13 is a fragmentary sectional view taken through the line 13—13 shown in FIG. 12.

Referring to FIGS. 11, 12 and 13, the land sections 64A and 64B are spaced from each other and have opposed spaced end walls facing each other. The land section 64A keeps on contacting with a wall segment 52, while the land section 64B keeps on contacting with a wall section 54. The land section 64A is formed with transfer passages 120 similar to the transfer passages 86 shown in FIG. 2. Each of the transfer passages 120 is open ended within the end wall of the land section 64A which faces the opposed end wall of the land section 64B. This structure provides pass for appropriate tool for forming the transfer passages 120.

Figure 14:
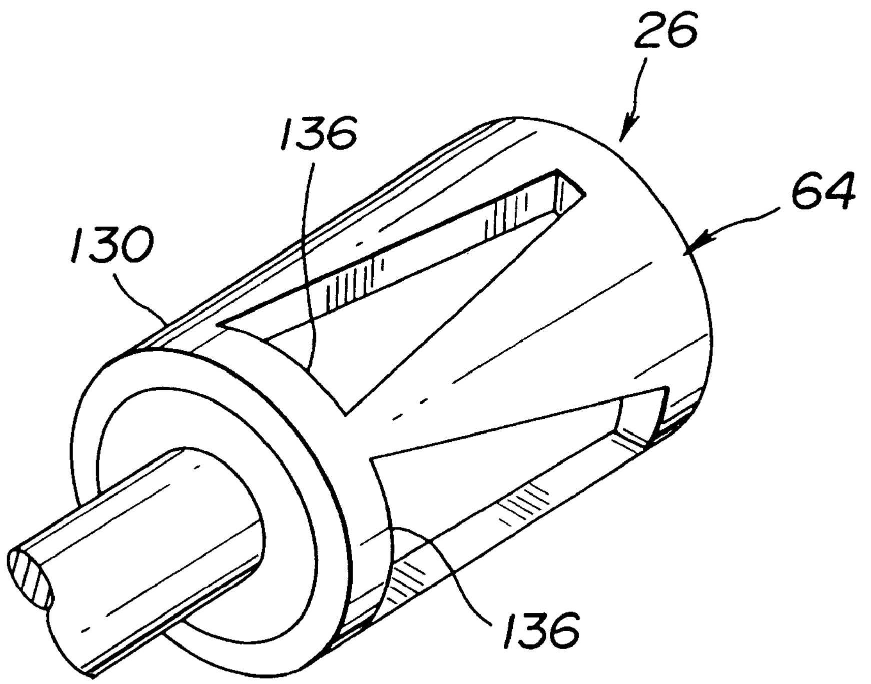
FIG. 14 is a similar view to FIG. 2 illustrating a fourth modification of the spool.
Figure 15:
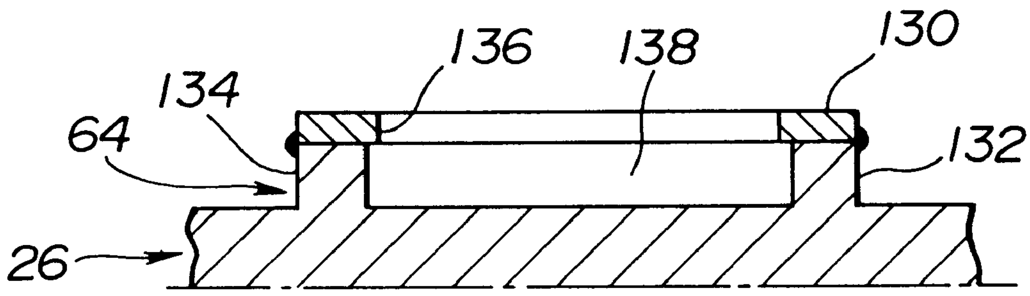
FIG. 15 is a fragmentary sectional view illustrating the depth of groove of the spool shown in FIG. 14.

Referring to FIGS. 14 and 15, another approach to solve the above-mentioned problem is described. This approach is applicable to the design of the transfer passages 100 shown in FIGS. 5, 6 and 7. As different from the land 64 of a single piece structure shown in FIGS. 5, 6 and 7, a land 64 shown in FIGS. 14 and 15 is composed of a masking sleeve 130 and two spaced lands 132 and 134. The land-like projection 132 is connected at its cylindrical outer surface with the cylindrical inner surface of the sleeve 130 at one end portion thereof. The other land-like projection 134 is connected at its cylindrical outer surface with the cylindrical inner surface of the sleeve 130 at the opposite end portion thereof. The connection between the sleeve 130 and the two lands 132 and 134 should be tight enough to prevent leakage of hydraulic fluid through interface between each of the lands 132 and 134 and the sleeve 130. The sleeve 130 is formed with windows 136. Each of the windows 136 has the same contour as that of each of the transfer passages 100 shown in FIGS. 5, 6 and 7. According to this modification, the windows 136 and an annular chamber 138 defined by the sleeve 130 and spool 26 between the spaced lands 132 and 134 cooperate with each other to form a plurality of transfer passages 100.

It will be appreciated from this modification that forming the windows 130 through the sleeve 130 and the subsequent fabrication are not difficult.

Figure 16A:
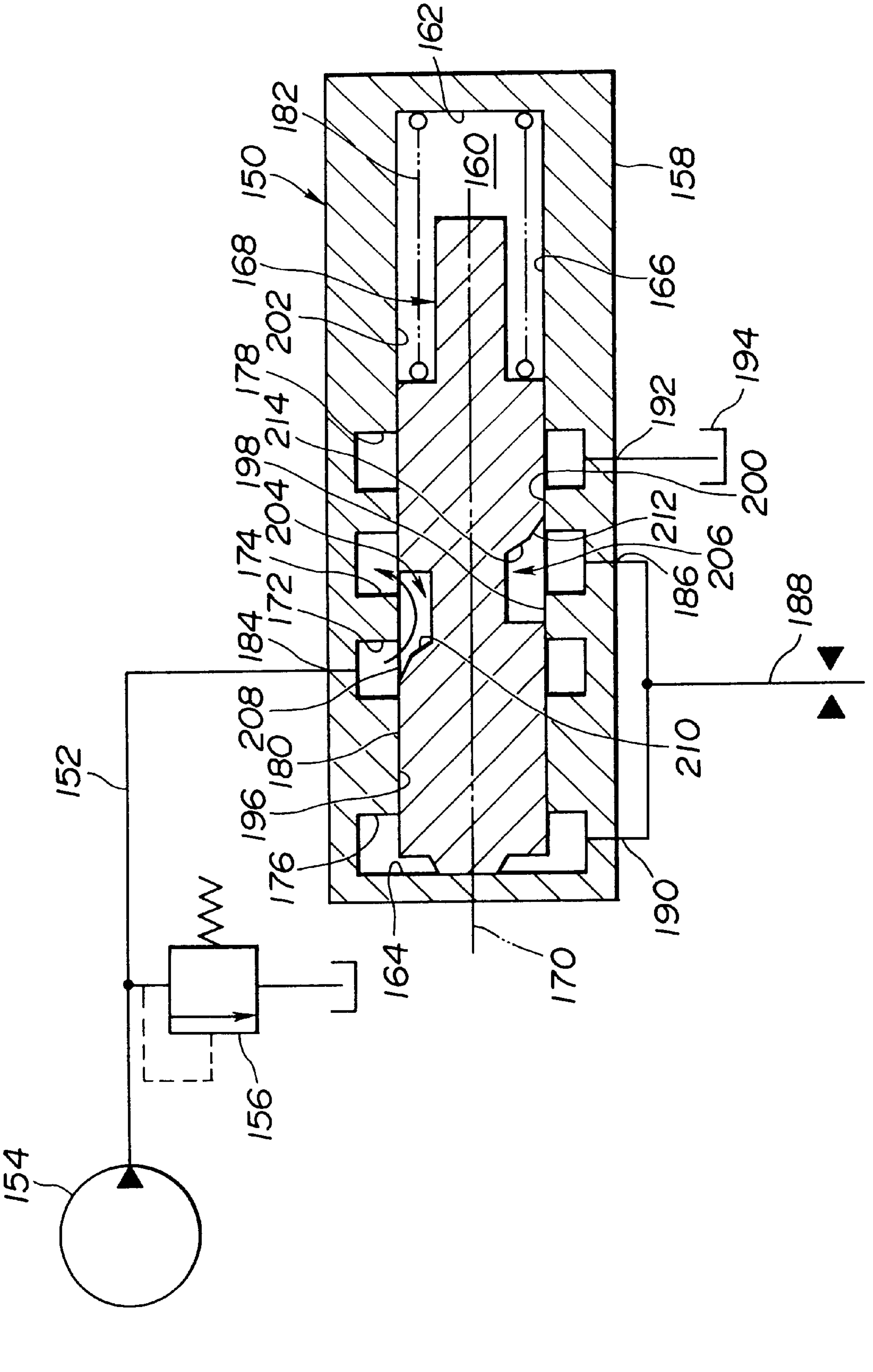
FIG. 16A is a schematic sectional view of a second embodiment of a valve according to the present invention.

Referring to FIGS. 16A, 16B, 16C and 17, a pressure reduction valve 150 embodying the present invention is described. In FIG. 16A, the pressure reduction valve 150 is schematically illustrated in association with a supply line 150 that is connected to an oil pump 154 and a relief valve 156. The pressure reduction valve 150 includes a valve body 158. The valve body 158 is formed with a valve bore 160 and has two end walls 162 and 164 that are spaced and interconnected by a cylindrical inner wall 166 to define the bore 160. The bore 160 has received therein a spool 168. The spool 168 can move along a longitudinal center line 170 along which the end walls 162 and 164 are spaced. The bore 160 is of the same diameter over the whole longitudinal length thereof. The valve body 158 is formed with an inflow groove 172 and an outflow groove 174. The inflow and outflow grooves 172 and 174 are recessed from the bore 160 into the cylindrical inner wall 166 and spaced from each other along the longitudinal center line 166. The valve body 158 is also formed with a signal or feedback pressure groove 176 and a drain groove 178. The feedback pressure groove 176 is recessed from the bore 160 into the cylindrical inner wall 166. The feedback pressure groove 176 is spaced from the inflow groove 172 along the longitudinal line 170 in a direction opposite to a direction in which the outflow groove 174 is spaced from the inflow groove 172. The drain groove 178 is recessed from the bore 160 into the cylindrical inner wall 166 and spaced from the inflow groove 172 in the same direction as the direction in which the outflow groove 174 is spaced from the inflow groove 172. The drain groove 178 is spaced remoter from the inflow groove 174 than the outflow groove 174 is spaced from the inflow groove 172.

The spool 168 has a land 180. A spring 182 mounted within the bore 160. At one end thereof, the spring 182 bears against the end wall 162 and at the opposite end thereof, it bears against the land 180.

The inflow groove 172 communicates with an inlet port 184 that is connected to the supply line 152. The outflow groove 174 communicates with an outlet port 186 that is connected to a delivery line 188. The feedback groove 176 communicates with a feedback port 190 that is connected to the outlet port 186. The drain groove 178 communicates with a drain port 192 that is connected to drainage 194. The feedback groove 177, inflow groove 172, outflow groove 174 and drain groove 178 are arranged in this order along the longitudinal 170 in a direction from the end wall 164 toward the end wall 162. These spaced lands separate the cylindrical inner wall into four wall segments 196, 198, 200 and 202. The wall segment 196 is defined between the feedback groove 176 and the inflow groove 172. The wall segment 198 is defined between the inflow groove 172 and the outflow groove 174. The wall segment 200 is defined between the outflow groove 174 and the drain groove 178. The wall segment 202 is defined between the drain groove 178 and the end wall 162.

Figure 17:
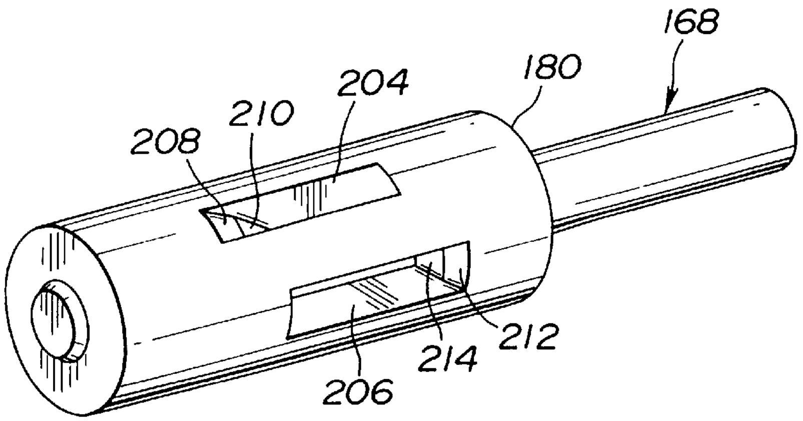
FIG. 17 is a perspective view of the spool used in FIG. 16A.

As best seen in FIG. 17, the land 180 of the spool 168 is formed with at least one high-pressure transfer passage 204 and at least one low-pressure transfer passage 206. In this embodiment, the land 180 is formed with two such high-pressure transfer passages, each of them being designated by the same reference numeral 204. It is formed with two such low-pressure transfer passages, each of them being designated by the same reference numeral 206. Each of the high-pressure transfer passages 204 is in the form of an axial groove that extends along the longitudinal line 170 of the bore 160. The high-pressure transfer passages 204 are parallel to each other and spaced from each other in an angular direction about the longitudinal line 170 of the bore 160. Similarly, each of the low-pressure transfer passages 206 is in the form of an axial groove that extends along the longitudinal line 170 of the bore 160. The low-pressure transfer passages 206 are parallel to each other and spaced from each other in an angular direction about the longitudinal line 170 of the bore 160.

The arrangement is such that the high-pressure transfer passages 204 are always open to the outflow groove 174 and the low-pressure transfer passages 206 are always open to the outflow groove 174 over the whole stroke of the spool 168 within the bore 160.

The width of each of the high-pressure transfer passages 204 is unaltered over the whole length from one end adjacent to the inflow groove 172 to the opposite end remotest from the inflow groove 172. The depth of each of the high-pressure transfer passages 204 increases at a first gradual rate from the level of the surface of the land 180 for a unit increase in the distance from the one end until a first predetermined distance is reached. After the first predetermined distance has been reached, the depth increases at a second gradual that is greater than the first gradual rate for a unit increase in the distance until a second predetermined distance that is greater than the first predetermined distance is reached. After the second predetermined distance has been reached, the depth is unaltered until a third predetermined distance is reached. This third predetermined distance is greater than the second predetermined distance and it is the distance over which the opposite end of each of the high-pressure transfer passages 204 is spaced from the one end thereof. In FIGS. 16A to 16C and 17, the reference numeral 208 designates a gradual slope until the first predetermined distance is reached, and the reference numeral 210 designates a steep slope after the first predetermined distance has been reached until the second predetermined distance is reached.

The width of each of the low-pressure transfer passages 206 is unaltered over the whole length from one end adjacent to the drain groove 178 to the opposite end remotest from the drain groove 178. The depth of each of the low-pressure transfer passages 206 increases at a first gradual rate from the level of the surface of the land 180 for a unit increase in the distance from the one end until a first predetermined distance is reached. After the first predetermined distance has been reached, the depth increases at a second gradual that is greater than the first gradual rate for a unit increase in the distance until a second predetermined distance that is greater than the first predetermined distance is reached. After the second predetermined distance has been reached, the depth is unaltered until a third predetermined distance is reached. This third predetermined distance is greater than the second predetermined distance and it is the distance over which the opposite end of each of the low-pressure transfer passages 206 is spaced from the one end thereof. In FIGS. 16A to 16C and 17, the reference numeral 212 designates a gradual slope until the first predetermined distance is reached, and the reference numeral 214 designates a steep slope after the first predetermined distance has been reached until the second predetermined distance is reached.

When the oil pump 154 is at rest, the spool 168 assumes a position set by the spring 182 as illustrated in FIG. 16A. In the spring set position, the wall segment 198 engages the land 180 and exposes both of the slopes 208 and 210 of each of the high-pressure transfer passages 204 to the inflow groove 172 thereby providing the maximum effective flow area at each of the high-pressure transfer passages 204. In this position, the wall segment 200 engages the land 180 at a portion between the one end of each of the low-pressure transfer passages 206 and the adjacent end of the land 180 thereby blocking flow communication between the low-pressure transfer passages 206 and the drain groove 178.

Figure 16B:
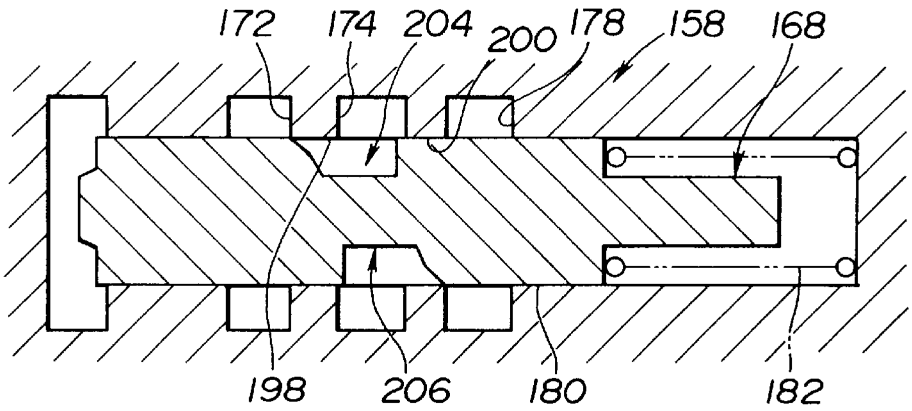
FIG. 16B and 16C illustrate two other different position of the spool than the position as illustrated in FIG. 16A.
Figure 16C:
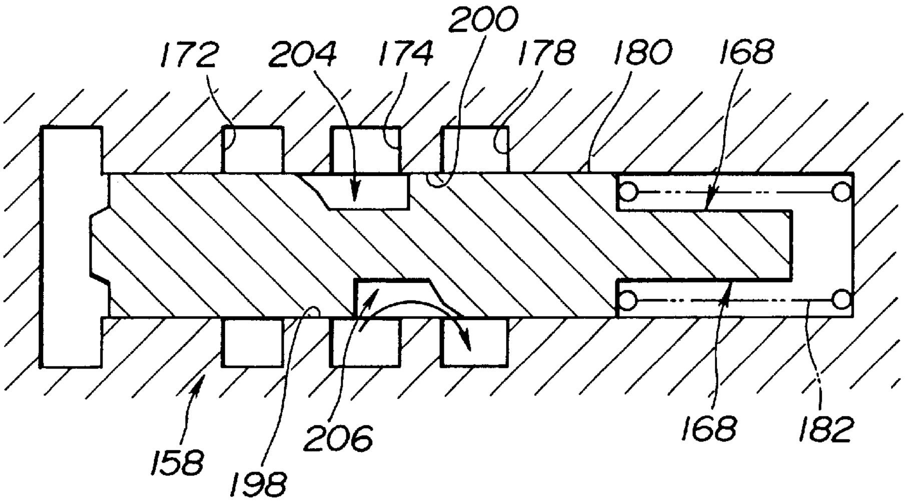

Referring also to FIGS. 16B and 16C, we will now consider a stroke of the spool 168. FIG. 16B illustrates position of the spool 168 when pressure P1 at the delivery line 188 is equal to a predetermined pressure value P0, which is determined by an area of pressure acting area of the spool 168 exposed to the feedback groove and the force of the spring 182. FIG. 16C illustrates position of the spool 168 when pressure P1 exceeds P0.

FIG. 16A illustrates position of the spool 168 when pressure P1 is less than P0. Let us now consider a stroke of the spool 168 from the spring set position shown in FIG. 16A to the position shown in FIG. 16B. During this stroke, the wall segment 198 decreases the exposure area of the slope 210 of each of the high-pressure transfer passages 204 to the inflow groove at a rate that is determined by gradient of the slope 210 for a unit increase in movement of the spool 168. After having covered the slope 210 of each of the high-pressure transfer passages 204, the wall segment 198 decreases the exposure area of the slope 208 of each of the high-pressure transfer passages 204. Immediately before or upon the spool 168 reaching the position shown in FIG. 16B, the wall segment 198 covers the slope 208 of each of the high-pressure transfer passages 204 thereby blocking flow communication between the inflow groove 172 and the outflow groove 174. During this stroke of the spool 168, the wall segment 200 continues to block flow communication between the low-pressure transfer passages 206 and the drain groove 178. From this description, it will now be appreciated that inflow versus spool stroke characteristic is determined by gradients of slopes 210 and 208 of each of the high-pressure transfer passages 204. In other words, structure of the high-pressure transfer passages 204 determines the flow versus spool stroke characteristic.

At the position shown in FIG. 16B, the wall segment 198 blocks flow communication between the inflow groove 172 and the high-pressure transfer passages 204, and the wall segment 200 blocks flow communication between the low-pressure transfer passages 206 and the drain groove 178.

Movement of the spool from the position shown in FIG. 16B toward the position shown in FIG. 16C causes the wall segment 200 to expose the slope 212 of each of the low-pressure transfer passages 206 to the drain groove 178. If this movement is great, the wall segment 200 expose the slope 214 of each of the low-pressure transfer passages 206 to the drain groove 178, too. From this description, it will be appreciated that the structure of each of the low pressure transfer passages 206 determines drain flow versus spool stroke characteristic.

In the previously described embodiments, hydraulic pressure acting on the pressure acting area or areas of the spool and the force of the spring cooperate to control stroke of the spool. Other drivers, such as a stepping motor of the linear type, may be used to control the stroke of the spool.

What is claimed is:

1. A hydraulic control circuit for an automatic transmission, comprising:

an oil pump as a source of hydraulic fluid;

a system pressure line connected to said oil pump;

a pressure regulator valve consisting essentially of:

a valve body formed with a bore having a longitudinal center line, said valve body being formed with an inlet port connected to said system pressure line and an outlet port, said valve body including a cylindrical inner wall defining said bore and formed with an inflow groove communication with said inlet port and an outflow groove communication with said outlet port, said inflow and outflow grooves being recessed from said bore into the cylindrical inner wall and spaced from each other along said longitudinal center line to define therebetween a cylindrical inner wall segment, said cylindrical inner wall segment having an edge adjacent said inflow groove; and a spool within said bore for movement along said longitudinal center line, said spool including a land opposed to said cylindrical inner wall segment, said land being in sliding fit to said cylindrical inner wall segment during movement of said spool to close a clearance between said land and said cylindrical inner wall segment, said land being formed with a plurality of transfer passages bounded within said land, each of said plurality of transfer passages being in the form of a groove that extends along said longitudinal center line, said plurality of transfer passages being separated from each other, each of said plurality of transfer passages having one end wall and other end wall and extending from said one end wall to said other end wall, each of said plurality of transfer passages having a predetermined section extending from said one end wall to a point between said one end wall and said other end wall, said predetermined section of each transfer passage being opposed to said cylindrical inner wall segment and prevented from communicating with said inflow groove when said spool assumes a predetermined position relative to said valve body, said predetermined section of each transfer passage being brought into opposed relation to said inflow groove gradually as said spool moves from said predetermined position within a predetermined stroke of movement of said spool relative to said valve body, said edge of said cylindrical inner wall segment and said predetermined section defining various flow cross sectional areas as said spool moves from said predetermined position within said predetermined stroke of movement of said spool relative to said valve body.

2. The hydraulic control circuit as claimed in claim 1, wherein effective flow cross sectional area of flow through said inlet port, said transfer passages and said outlet port is variable in response to movement of said spool.

3. The hydraulic control circuit as claimed in claim 2, wherein each of said transfer passages has one end and opposite end that are spaced a distance along said longitudinal center line, wherein each of said transfer passages has a width unaltered over the entirety of said distance, and wherein each of said transfer passages has variable depths along said distance.

4. The hydraulic control circuit as claimed in claim 2, wherein said one end wall and said other end wall of each of said transfer passages are spaced a distance along said longitudinal center line, wherein said predetermined section of each of said transfer passages has variable widths along said distance, wherein each of said transfer passages has a depth unaltered over the entirety of said distance.

5. The hydraulic control circuit as claimed in claim 1, wherein said land of said spool includes two spaced land-like projections and a sleeve interconnecting said two spaced land-like projections to define a continuous space inward of said sleeve, and wherein said sleeve is formed with a window opening to said continuous space thereby defining said plurality of transfer passages.

6. A valve consisting essentially of:

a valve body formed with a bore having a longitudinal center line, said valve body including a cylindrical inner wall and two end walls spaced along said longitudinal center line and interconnected by said cylindrical inner wall to define said bore, said valve body being formed with an inflow groove that is recessed from said bore into said cylindrical inner wall, said valve body being formed with an outflow groove that is recessed from said bore into said cylindrical inner wall, said inflow and outflow grooves dividing said cylindrical inner wall into a plurality of wall segments including a predetermined wall segment that separates said inflow groove from said outflow groove, said predetermined wall segment including an edge adjacent said inflow groove; and a spool within said bore for movement along said longitudinal center line, said spool including a land, said land being opposed to said predetermined wall segment and in sliding fit to said predetermined wall segment during movement of said spool to close a clearance between said land and said predetermined wall segment, said land being formed with a plurality of transfer passages bounded within said land, each of said plurality of transfer passages being in the form of a groove that extends along said longitudinal center line, said land being opposed to said predetermined wall segment and in sliding fit to said predetermined wall segment to close a clearance between said land and said predetermined wall segment during movement of said spool relative to said valve body over substantially all stroke allowed for said spool to move along said longitudinal center line, each of said plurality of transfer passages being open to said outflow groove over substantially all stroke allowed for said spool to move along said longitudinal center line, said plurality of transfer passages being separated from each other, each of said plurality of transfer passages having one end wall and other end wall and extending along said center line from said one end wall to said other end wall, each of said plurality of transfer passages having a predetermined section extending from said one end wall to a point between said one end wall and said other end wall, said predetermined section of each transfer passage being opposed to said predetermined wall segment and prevented from communication with said inflow groove when said spool assumes a predetermined position relative to said valve body, said predetermined section of each transfer passage being brought into opposed relation to said inflow groove gradually as said spool moves from said predetermined position within the stroke allowed for said spool to move along said center line relative to said valve body, said edge of said predetermined wall segment and said predetermined section defining various flow cross sectional areas as said spool moves from said predetermined position within the stroke allowed for said spool to move along said center line relative to said valve body.

7. A valve as claimed in claim 6, wherein said one end wall of each of said plurality of transfer passages is spaced a distance from said other end wall along said longitudinal center line and leading to said other end wall with respect to movement of said spool in a direction from said outflow groove toward said inflow groove.

8. A valve as claimed in claim 7, wherein each of said plurality of transfer passages has a width unaltered over said distance from said one end to said other end;

wherein said predetermined section of each of said plurality of transfer passages has a first slope adjacent said one end to provide variable depths over a first predetermined distance from said end toward said other end;

wherein said predetermined section of each of said plurality of transfer passages has a second slope connected with said first slope to provide variable depths over a second predetermined distance, beyond said first predetermined distance, from said one end toward said other end, said second predetermined distance being greater than said first predetermined distance;

wherein each of said plurality of transfer passages has a flat bottom connected with said second slope to provide a depth that is unaltered over a third predetermined distance, beyond said first and second predetermined distances, from said one end toward said other end; and wherein said first and second slopes have different gradients.

9. A valve as claimed in claim 7, wherein each of said plurality of transfer passages has variable widths that gradually increase form said one end toward said opposite end; and wherein each of said plurality of transfer passages has a depth that is unaltered over the entire length from said one end to said opposite end.

10. A valve as claimed in claim 7, wherein each of said plurality of transfer passages has a width unaltered from said one end to said other end; and wherein each of said plurality of transfer passages has a cylindrical bottom wall interconnecting said one and other ends to provide variable depths from said one end to said other end.

11. A valve as claimed in claim 7, wherein said land includes a first land section and a second land section, said first land section being kept in contact with said predetermined wall segment and formed with said plurality of transfer passages; and wherein said first and second land sections are spaced from each other to provide a path for a tool for cutting said plurality of transfer passages.

12. A valve as claimed in claim 11, wherein said second land section is kept in contact with the adjacent wall segment that is disposed on the remote side of said outflow groove from said inflow groove.

13. A valve as claimed in claim 7 wherein said land includes spaced first and second land-like projections and a sleeve interconnecting said first and second land-like projections; and wherein said sleeve is formed with a plurality of windows, each extending between said one and said other end to define one of said plurality of transfer passages.

* * * * *